United States Patent
Jiang

(10) Patent No.: US 11,357,068 B2
(45) Date of Patent: Jun. 7, 2022

(54) RANDOM ACCESS FAILURE PROCESSING METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 47 days.

(21) Appl. No.: 16/770,404

(22) PCT Filed: Dec. 29, 2017

(86) PCT No.: PCT/CN2017/120037
§ 371 (c)(1),
(2) Date: Jun. 5, 2020

(87) PCT Pub. No.: WO2019/127438
PCT Pub. Date: Jul. 4, 2019

(65) Prior Publication Data
US 2020/0323009 A1 Oct. 8, 2020

(51) Int. Cl.
H04W 76/18 (2018.01)
H04W 74/00 (2009.01)
H04W 74/08 (2009.01)

(52) U.S. Cl.
CPC ......... *H04W 76/18* (2018.02); *H04W 74/004* (2013.01); *H04W 74/0833* (2013.01)

(58) Field of Classification Search
CPC .. H04L 5/0008; H04L 5/0048; H04W 74/004; H04W 74/0833; H04W 76/18; H04W 76/19
See application file for complete search history.

(56) References Cited

U.S. PATENT DOCUMENTS

| 2012/0281548 A1* | 11/2012 | Lin | H04L 5/001 370/242 |
| 2013/0039314 A1* | 2/2013 | Prateek | H04W 74/08 370/329 |

(Continued)

FOREIGN PATENT DOCUMENTS

| CN | 101841401 A | 9/2010 |
| CN | 102056297 A | 5/2011 |

(Continued)

OTHER PUBLICATIONS

International Search Report of PCT Application No. PCT/CN2017/120037 dated Jul. 25, 2018.

(Continued)

*Primary Examiner* — Kashif Siddiqui
(74) *Attorney, Agent, or Firm* — Finnegan, Henderson, Farabow, Garrett & Dunner, L.L.P.

(57) ABSTRACT

A random access failure processing method includes: determining a cell and a carrier used to send a preamble for random access when the preamble is sent to a base station a number of times greater than a preset number; and transmitting, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

21 Claims, 18 Drawing Sheets

Determining a cell and a carrier used to send a preamble for random access when the preamble is sent to a base station for a number of times greater than a preset number — S1

Transmitting, under a case where the cell adopted to send the preamble is a primary cell configured with an SUL carrier and a non-SUL carrier, a message indicating presence of problems with the random access to the base station through the SUL carrier if the carrier adopted to send the preamble is the non-SUL carrier — S2

(56) References Cited

U.S. PATENT DOCUMENTS

| | | | |
|---|---|---|---|
| 2013/0058301 A1* | 3/2013 | Lee | H04W 74/002 |
| | | | 370/329 |
| 2013/0265866 A1* | 10/2013 | Yl | H04W 74/0858 |
| | | | 370/216 |
| 2015/0351061 A1* | 12/2015 | Kim | H04W 24/08 |
| | | | 370/252 |
| 2017/0070928 A1* | 3/2017 | Manepalli | H04W 48/20 |
| 2017/0085452 A1* | 3/2017 | Kato | H04W 76/18 |
| 2019/0306875 A1* | 10/2019 | Zhou | H04B 17/327 |
| 2019/0394805 A1* | 12/2019 | Kim | H04W 52/36 |
| 2020/0275489 A1* | 8/2020 | Ohlsson | H04W 24/08 |
| 2020/0396654 A1* | 12/2020 | Freda | H04W 36/06 |
| 2021/0044344 A1* | 2/2021 | Jiang | H04W 74/004 |
| 2021/0227413 A1* | 7/2021 | Yang | H04W 72/0446 |

FOREIGN PATENT DOCUMENTS

| | | |
|---|---|---|
| CN | 102196590 A | 9/2011 |
| CN | 102378380 A | 3/2012 |
| EP | 3 188 433 A1 | 7/2017 |

OTHER PUBLICATIONS

First Office Action of Chinese Application No. 201780002378.7 dated Dec. 29, 2020.

Huawei, HiSilicon; Discussion on the PRACH for SUL, 3GPP TSG RAN WG1 Meeting NR#3, R1-1715716, Nagoya, Japan, Sep. 18-21, 2017, 5 pages.

\* cited by examiner

RANDOM ACCESS FAILURE PROCESSING METHOD AND APPARATUS

CROSS REFERENCE TO RELATED APPLICATIONS

This application is a national phase application based on PCT/CN2017/120037, filed Dec. 29, 2017, the content of which is incorporated herein by reference.

TECHNICAL FIELD

The present disclosure relates to the field of communication technologies, and more particularly to a random access failure processing method and apparatus, an electronic device, and a computer-readable storage medium.

BACKGROUND

In long term evolution (LTE), user equipment may initiate random access to a base station on a carrier of a cell.

In new radio (NR), a supplement uplink (SUL) carrier is introduced to enhance uplink coverage. Instead of corresponding to a cell alone, the SUL carrier corresponds to a cell paired with a non-SUL carrier.

At present, the method in LTE for processing failures in initiating the random access is mainly applicable to a case where a cell is configured with one carrier, whereas for a case where a cell in NR is configured with both of the SUL carrier and non-SUL carrier, there is no appropriate processing method in the related art.

SUMMARY

According to a first aspect of embodiments of the present disclosure, a random access failure processing method applicable to user equipment in a connection state is provided. The method includes:

determining a cell and a carrier used to send a preamble for random access when the preamble is sent to a base station a number of times greater than a preset number; and transmitting, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

According to a second aspect of embodiments of the present disclosure, user equipment in a connection state is provided. The user equipment includes:

a processor; and a memory for storing a processor-executable instruction, wherein the processor is configured to:

determine a cell and a carrier used to send a preamble for random access when the preamble is sent to a base station a number of times greater than a preset number; and transmit, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

According to a fourth aspect of embodiments of the present disclosure, a computer readable storage medium in which a computer program in stored is provided. The computer readable storage medium is applicable to user equipment in a connection state, and when the program is executed by a processor, following steps are realized:

determining a cell and a carrier used to send a preamble for random access when the preamble is sent to a base station a number of times greater than a preset number; and transmitting, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

According to embodiments of the present disclosure, if it is determined that the non-SUL carrier of the primary cell has a problem, the SUL carrier may not have a problem even if the SUL carrier has a problem because the primary cell is further configured with the SUL carrier and the SUL carrier generally has better performance than the non-SUL carrier. Therefore, the message indicating presence of problems in the random access can be transmitted to the base station through the SUL carrier, so as to ensure that the base station can timely receive the problems and thereby punctually deal with the problems.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Technical solutions of embodiments of the present disclosure will be described clearly and completely below in combination with the accompanying drawings in embodiments of the present disclosure. It is obvious that the described embodiments are only a part of embodiments of the present disclosure, not all embodiments of the present disclosure. All the other embodiments achieved by those of ordinary skills in the art, based on the embodiments of the present disclosure without creative work, shall fall within the protection scope of the present disclosure.

Figure 1:
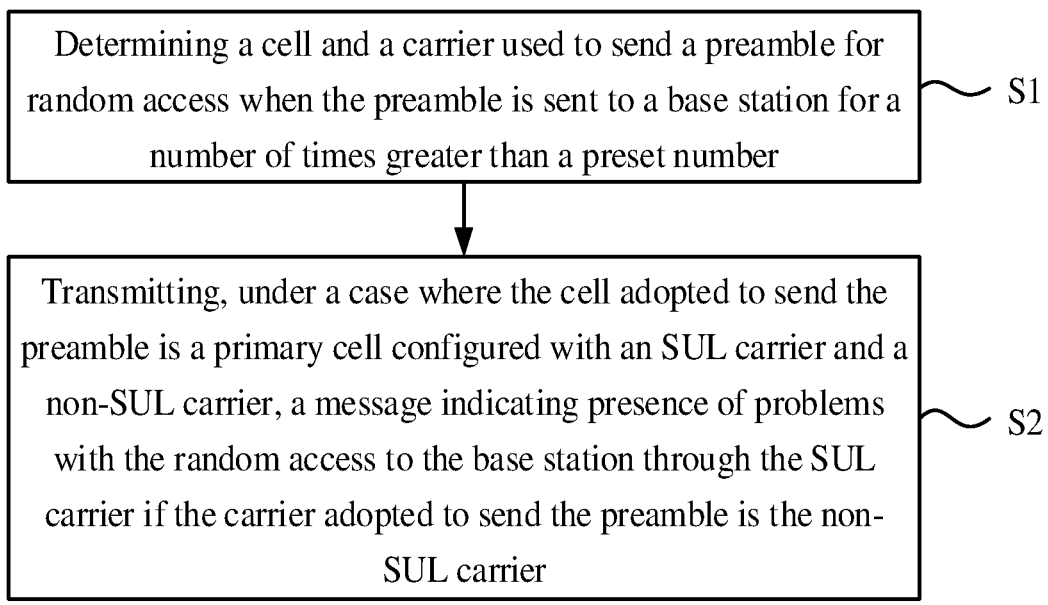
FIG. 1 is a flow chart of a random access failure processing method according to an embodiment of the present disclosure.

FIG. 1 is a flow chart of a random access failure processing method according to an embodiment of the present disclosure. The random access failure processing method according to this embodiment may be applicable to user equipment, e.g. an electronic device such as a mobile phone, a tablet computer, and a wearable device or the like.

As shown in FIG. 1, the random access failure processing method may include following steps.

In step S1, a cell and a carrier used to send a preamble for random access is determined when the preamble is sent to a base station a number of times greater than a preset number.

In step S2, under a case where the cell used to send the preamble is a primary cell configured with an SUL carrier (which may be one SUL carrier or more than one SUL carrier) and a non-SUL carrier, a message indicating presence of problems in the random access is transmitted to the base station through the SUL carrier if the carrier used to send the preamble is the non-SUL carrier.

In an embodiment, when the user equipment initiates the random access to the base station, a preamble for random access is firstly sent to the base station. When the preamble is sent a number of times greater than a preset number (which may be configured, for example, on a base station side and sent to the user equipment, or configured on user equipment side according to needs), it may be determined that the initiated random access has failed.

If the random access is initiated by the user equipment through the non-SUL carrier in the primary cell, it may be determined that the non-SUL carrier of the primary cell has a problem. While, the SUL carrier may not have a problem even if the non-SUL carrier has a problem because the primary cell is further configured with the SUL carrier and the SUL carrier generally has better performance than the non-SUL carrier. Therefore, the message indicating presence of problems in the random access can be transmitted to the base station through the SUL carrier, so as to ensure that the base station can timely receive the problems and thereby punctually deal with the problems.

It should be noted that no matter the cell used to send the preamble is a primary cell, a primary secondary cell, or a cell other than the primary cell and the primary secondary cell, and no matter the carrier used to send the preamble is the SUL carrier or the non-SUL carrier, when the preamble for random access is sent to the base station a number of times greater than a preset number, a medium access control (MAC) layer of the user equipment may send an indication to a radio resource control (RRC) layer to indicate the presence of problems in the random access and also indicate the cell and carrier used to send the preamble. In addition to the RRC layer, the indication may be further sent to other upper layers of the MAC layer, such as a radio link control (RLC) layer, a packet data convergence protocol (PDCP) layer, and so on.

Figure 2:
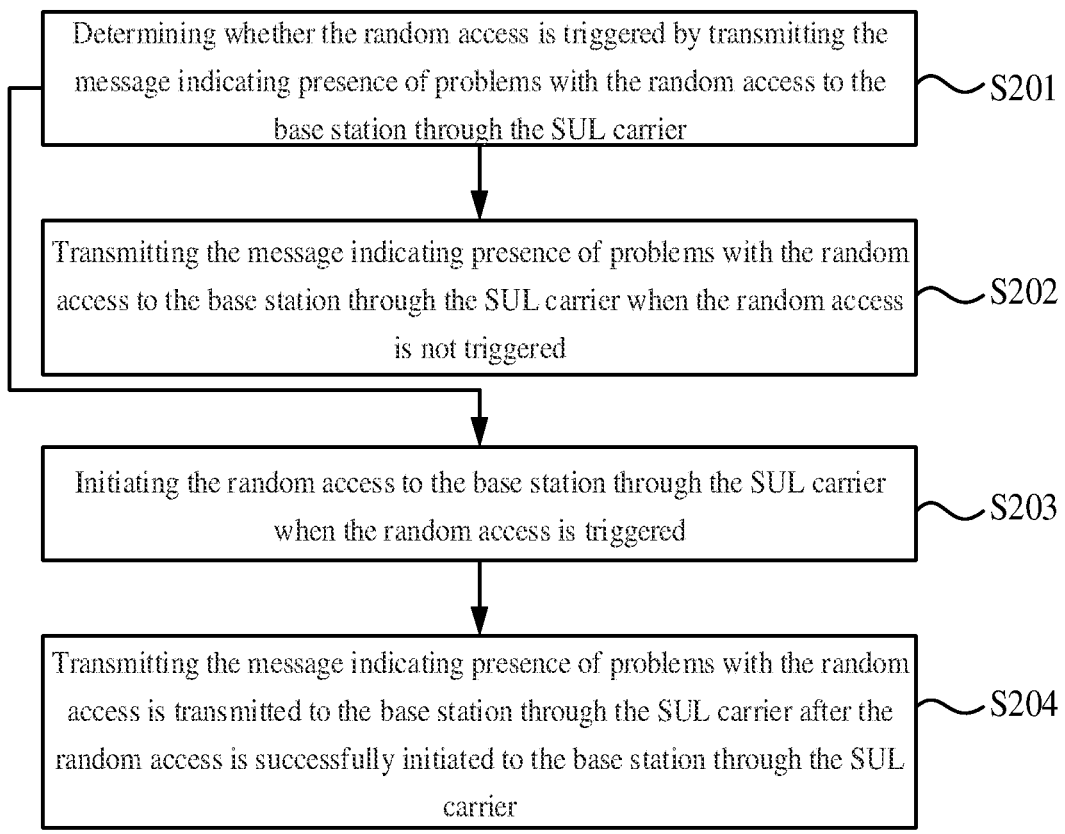
FIG. 2 is a flow chart of transmission of a message indicating presence of problems in random access to a base station through an SUL carrier according to an embodiment of the present disclosure.

FIG. 2 is a flow chart of transmission of a message indicating presence of problems in random access to a base station through an SUL carrier according to an embodiment of the present disclosure. As shown in FIG. 2, transmitting the message indicating presence of problems in the random access to the base station through the SUL carrier according to the embodiment shown in FIG. 1 may include following steps.

In step S201, it is determined whether the random access is triggered by transmitting the message indicating presence of problems in the random access to the base station through the SUL carrier.

In step S202, the message indicating presence of problems in the random access is transmitted to the base station through the SUL carrier if the random access is not triggered.

In step S203, the random access is initiated to the base station through the SUL carrier if the random access is triggered.

In step S204, the message indicating presence of problems in the random access is transmitted to the base station through the SUL carrier after successfully initiating the random access to the base station through the SUL carrier.

In an embodiment, when the message indicating presence of problems in the random access is transmitted to the base station through the SUL carrier, the random access may be triggered. For example, the random access may be triggered if uplink out-of-sync or a need to reestablish an RRC connection is detected. In addition to the two situations, there are other situations that may trigger the random access, which will not be described herein again.

In an embodiment, when the random access is triggered by transmitting the message indicating presence of problems in the random access to the base station through the SUL carrier, the random access may be initiated to the base station through the SUL carrier of the primary cell since it is determined that the non-SUL carrier of the primary cell has a problem, so that the random access to the base station can be ensured, and thereby the message indicating presence of problems in the random access can be successfully transmitted to the base station.

Figure 3:
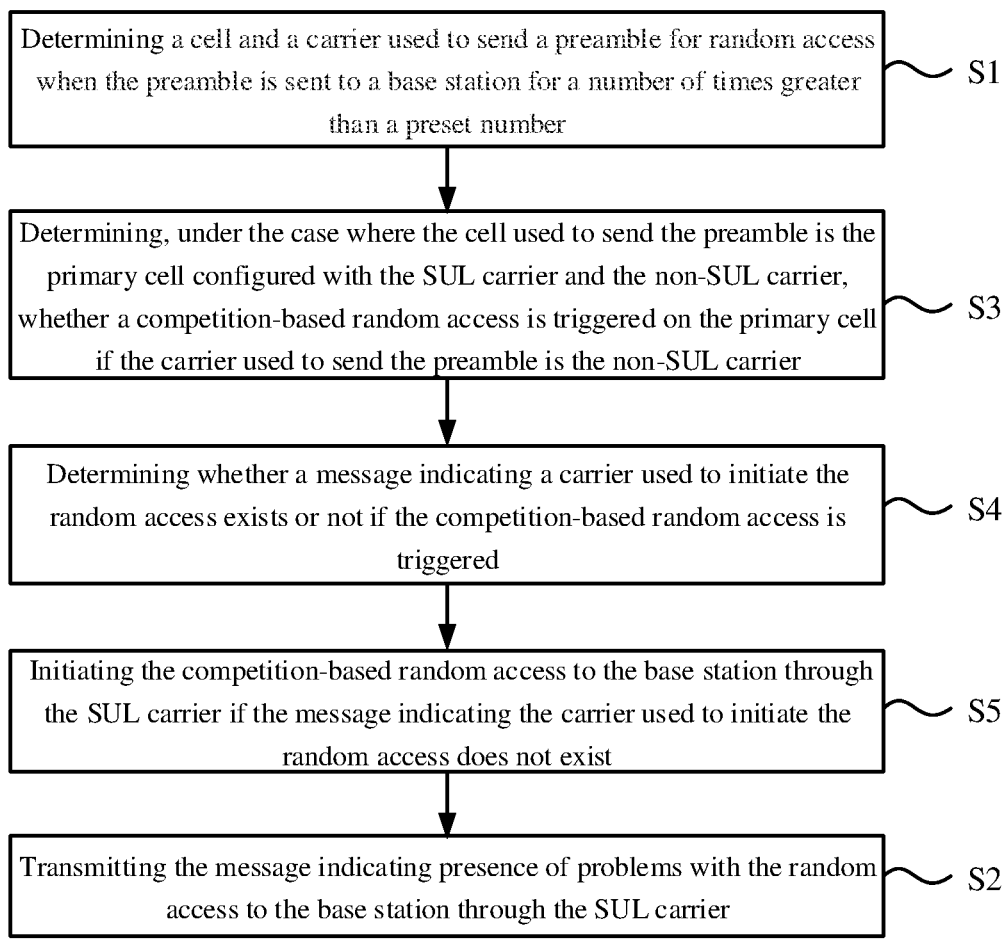
FIG. 3 is a flow chart of another random access failure processing method according to an embodiment of the present disclosure.

FIG. 3 is a flow chart of another random access failure processing method according to an embodiment of the present disclosure. As shown in FIG. 3, the method may further include following steps based on the embodiment shown in FIG. 1.

In step S3, it is determined whether a competition-based random access is triggered on the primary cell prior to transmitting the message indicating presence of problems in the random access to the base station through the SUL carrier.

In step S4, it is determined whether a message indicating a carrier used to initiate the random access exists or not if the competition-based random access is triggered.

In step S5, the competition-based random access is initiated to the base station through the SUL carrier if the message indicating the carrier used to initiate the random access does not exist.

In an embodiment, except that the random access is triggered on the primary cell by transmitting the message indicating presence of problems in the random access to the base station through the SUL carrier in the embodiment shown in FIG. 2, the random access may also be triggered on the primary cell prior to transmitting the message indicating presence of problems in the random access to the base station through the SUL carrier. For example, the random access may be triggered if uplink out-of-sync or a need to reestablish an RRC connection is detected. In addition to the two situations, there are other situations that may trigger the random access, which will not be described herein again.

In an embodiment, if the triggered random access is the competition-based random access and the message indicating the carrier used to initiate the random access does not exist, that is, if it is impossible to determine whether to select the non-SUL carrier or the SUL carrier to initiate the competition-based random access according to the message indicating the carrier used to initiate the random access, the user equipment, if failing to detect the message indicating the carrier used to initiate the random access, may initiate the competition-based random access to the base station through the SUL carrier that generally has better performance (e.g., signal strength) than the non-SUL carrier, so as to improve success rate of the competition and thereby improve success rate of the random access.

Figure 4:
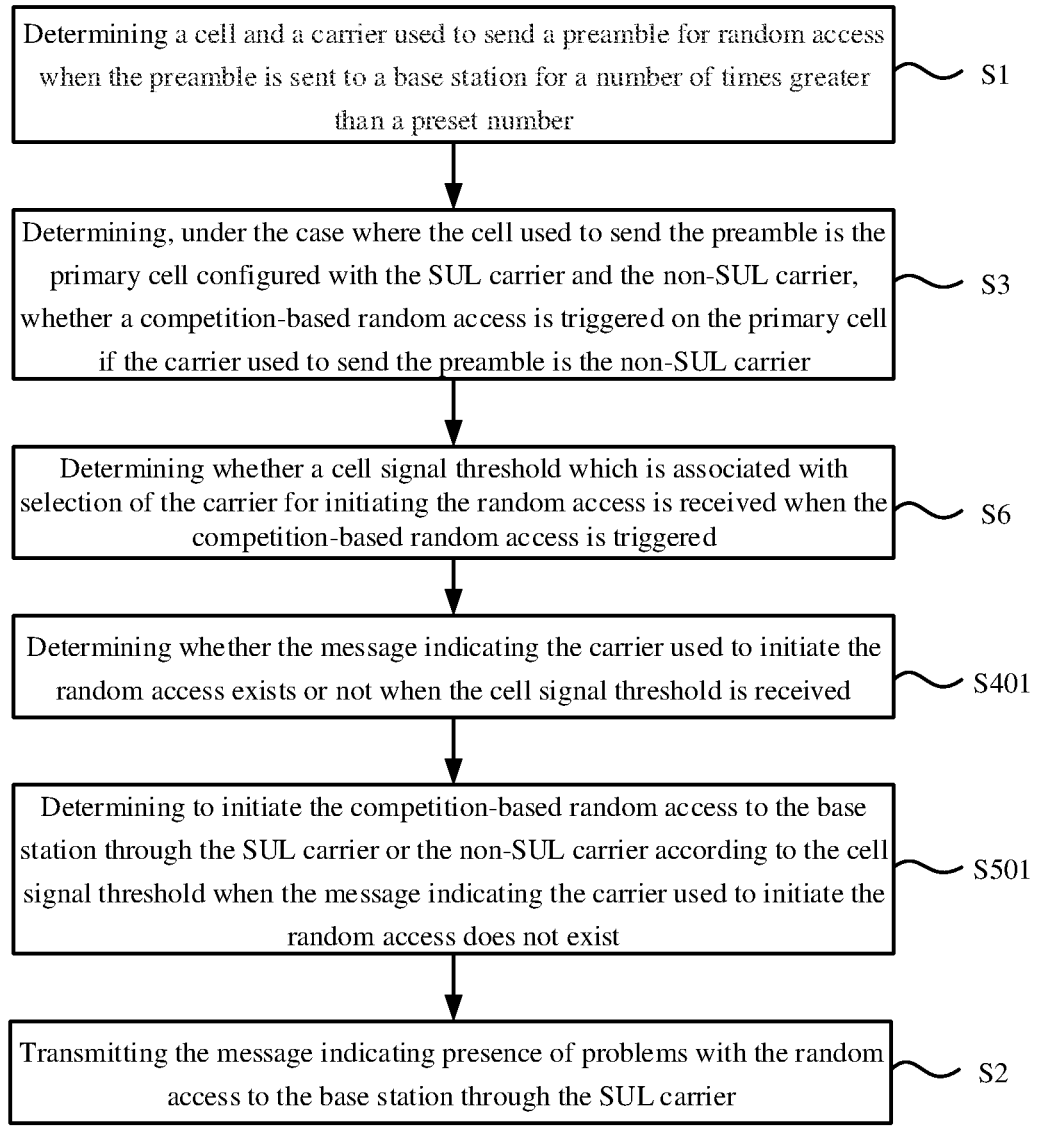
FIG. 4 is a flow chart of still another random access failure processing method according to an embodiment of the present disclosure.

FIG. 4 is a flow chart of still another random access failure processing method according to an embodiment of the present disclosure. As shown in FIG. 4, the method may further include following steps based on the embodiment shown in FIG. 3.

In step S6, it is determined whether a cell signal threshold which is associated with selection of the carrier while initiating the random access is received if the competition-based random access is triggered. The cell signal which is associated with selection of the carrier while initiating the random access may include reference signal receiving power (RSRP) and may also include reference signal receiving quality (RSRQ).

Determining whether the message indicating the carrier used to initiate the random access exists or not if the competition-based random access is triggered, and initiating the competition-based random access to the base station through the SUL carrier if the message indicating the carrier used to initiate the random access does not exist includes following steps.

In step S401, it is determined whether the message indicating the carrier used to initiate the random access exists or not if the cell signal threshold is received.

In step S501, it is determined to initiate the competition-based random access to the base station through the SUL carrier or the non-SUL carrier according to the cell signal threshold if the message indicating the carrier used to initiate the random access does not exist.

In an embodiment, under a case where it is determined that the cell signal threshold which is associated with selection of the carrier while initiating the random access is received, if the message indicating the carrier used to initiate the random access does not exist, that is, if it is impossible to determine whether to select the non-SUL carrier or the SUL carrier to initiate the competition-based random access according to the message indicating the carrier used to initiate the random access, it may be determined according to the cell signal threshold to initiate the competition-based random access to the base station through the SUL carrier or the non-SUL carrier. Taking the RSRP as an example, if RSRP of the primary cell is greater than the RSRP threshold, the competition-based random access may be initiated to the base station through the non-SUL carrier; and if RSRP of the primary cell is less than or equal to the RSRP threshold, the competition-based random access may be initiated to the base station through the SUL carrier.

Optionally, the message indicating presence of problems in the random access is a master cell group radio link failure message.

In an embodiment, the master cell group radio link failure (MCG RLF) message is sent to the base station, which makes it convenient for the base station to classify messages on problems in the random access.

Figure 5:
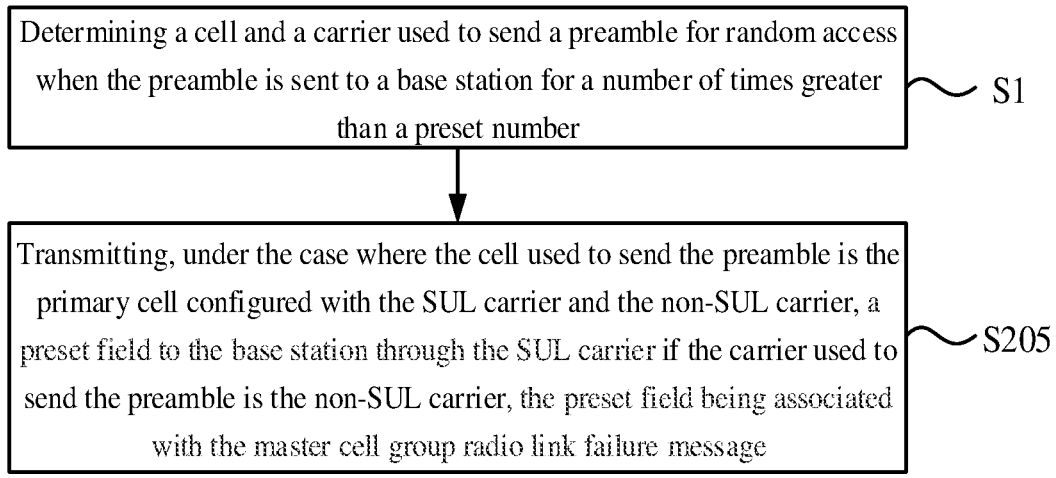
FIG. 5 is a flow chart of another transmission of a message indicating presence of problems in random access to a base station through an SUL carrier according to an embodiment of the present disclosure.

FIG. 5 is a flow chart of another transmission of a message indicating presence of problems in random access to a base station through an SUL carrier according to an embodiment of the present disclosure. As shown in FIG. 5, transmitting the message indicating presence of problems in the random access to the base station through the SUL carrier based on the embodiment shown in FIG. 1 may include following steps.

In step S205, a preset field is transmitted to the base station through the SUL carrier, the preset field being associated with the master cell group radio link failure message.

In an embodiment, the message indicating presence of problems in the random access may be transmitted to the base station through the preset field associated with the master cell group radio link failure message, so that the base station may determine that the received message indicating presence of problems in the random access belongs to the master cell group radio link failure message according to the preset field.

Figure 6:
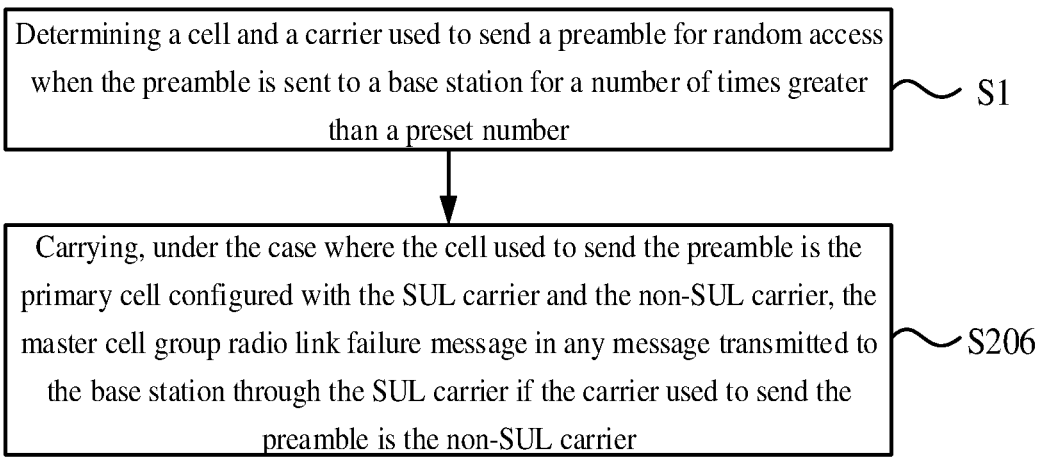
FIG. 6 is a flow chart of still another transmission of a message indicating presence of problems in random access to a base station through an SUL carrier according to an embodiment of the present disclosure.

FIG. 6 is a flow chart of still another transmission of a message indicating presence of problems in random access to a base station through an SUL carrier according to an embodiment of the present disclosure. As shown in FIG. 6, transmitting the message indicating presence of problems in the random access to the base station through the SUL carrier based on the embodiment shown in FIG. 1 may include following steps.

In step S206, the master cell group radio link failure message is carried in any message transmitted to the base station through the SUL carrier.

In an embodiment, the master cell group radio link failure message is carried in any message transmitted to the base station, so that there is no need to transmit the master cell group radio link failure message through a separate field.

Figure 7:
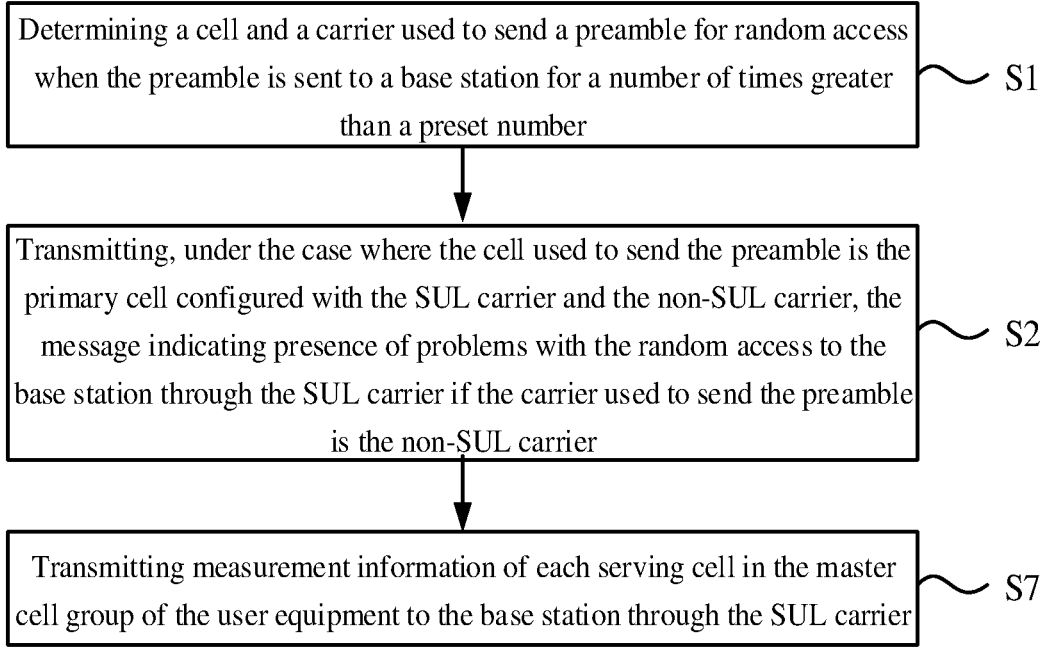
FIG. 7 is a flow chart of still another random access failure processing method according to an embodiment of the present disclosure.

FIG. 7 is a flow chart of still another random access failure processing method according to an embodiment of the present disclosure. As shown in FIG. 7, the method may further include following steps based on the embodiment shown in FIG. 1.

In step S7, measurement information of each serving cell in the master cell group of the user equipment is transmitted to the base station through the SUL carrier. The measurement information may include RSRP, or may also include RSRQ.

In an embodiment, under a case where it is determined that the non-SUL carrier has a problem, the measurement information of each serving cell in the master cell group of the user equipment may be transmitted to the base station through the SUL carrier, so that the base station may determine whether to instruct the user equipment to switch the cell in the serving cell of the master cell group according to the measurement information.

Figure 8:
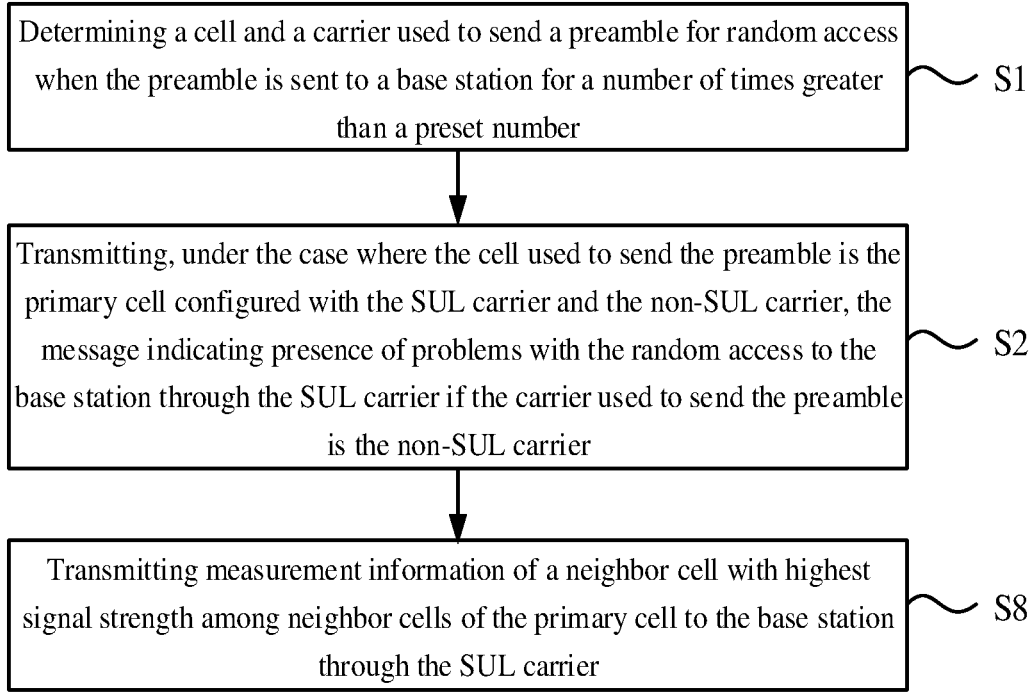
FIG. 8 is a flow chart of still another random access failure processing method according to an embodiment of the present disclosure.

FIG. 8 is a flow chart of still another random access failure processing method according to an embodiment of the present disclosure. As shown in FIG. 8, the method may further include following steps based on the embodiment shown in FIG. 1.

In step S8, measurement information of a neighbor cell with highest signal strength among neighbor cells of the primary cell is transmitted to the base station through the SUL carrier. The measurement information may include RSRP, or may also include RSRQ.

In an embodiment, under a case where it is determined that the non-SUL carrier has a problem, the measurement information of the neighbor cell with highest signal strength among neighbor cells of the primary cell may be transmitted to the base station through the SUL carrier, so that the base station may determine whether to instruct the user equip-ment to switch to the neighboring cell with the highest signal strength among neighboring cells of the primary cell according to the measurement information.

Figure 9:
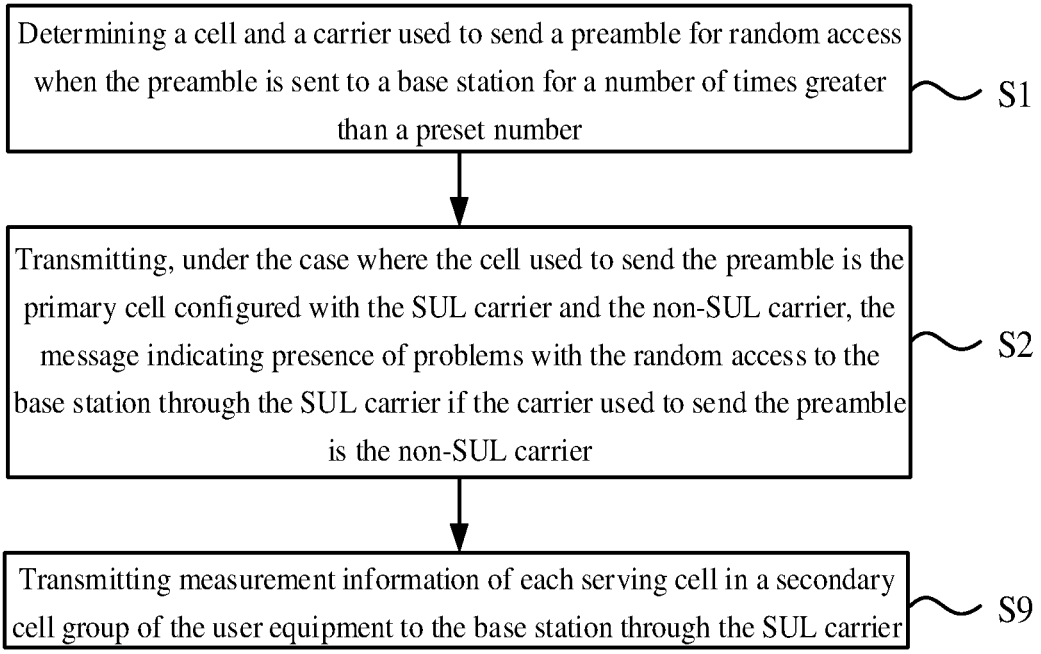
FIG. 9 is a flow chart of still another random access failure processing method according to an embodiment of the present disclosure.

FIG. 9 is a flow chart of still another random access failure processing method according to an embodiment of the present disclosure. As shown in FIG. 9, the method may further include following steps based on the embodiment shown in FIG. 1.

In step S9, measurement information of each serving cell in a secondary cell group of the user equipment is transmitted to the base station through the SUL carrier. The measurement information may include RSRP, or may also include RSRQ.

In an embodiment, under a case where it is determined that the non-SUL carrier has a problem, the measurement information of each serving cell in the secondary cell group of the user equipment may be transmitted to the base station through the SUL carrier, so that the base station may determine whether to instruct to switch the cell in the serving cell of the secondary cell group according to the measurement information.

Figure 10:
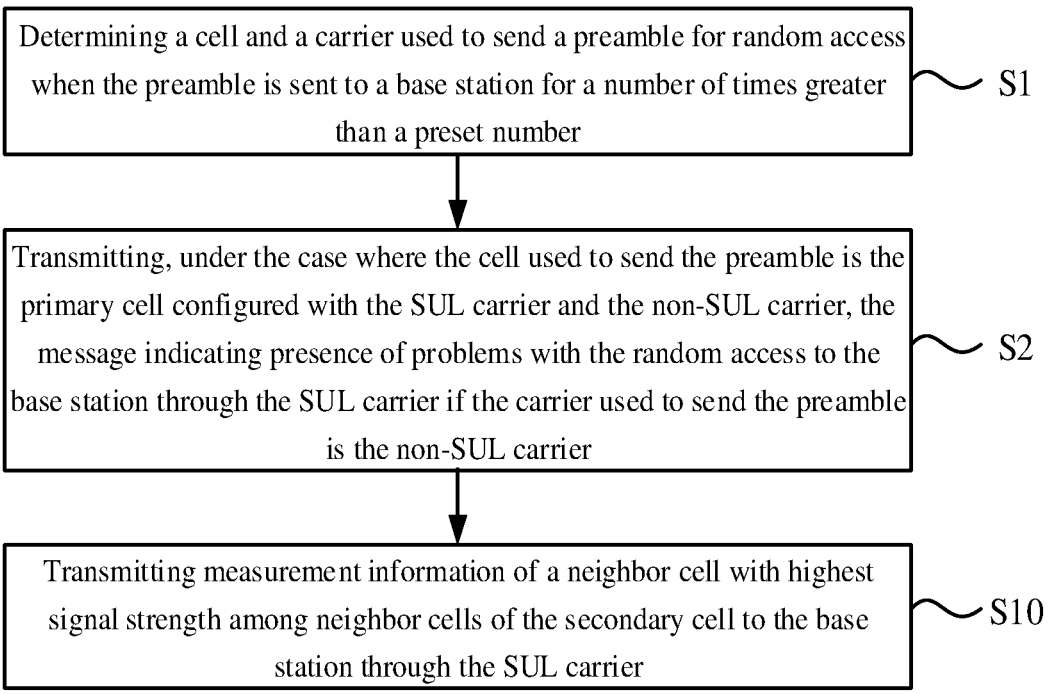
FIG. 10 is a flow chart of still another random access failure processing method according to an embodiment of the present disclosure.

FIG. 10 is a flow chart of still another random access failure processing method according to an embodiment of the present disclosure. As shown in FIG. 10, the method may further include following steps based on the embodiment shown in FIG. 1.

In step S10, measurement information of a neighbor cell with highest signal strength among neighbor cells of the secondary cell is transmitted to the base station through the SUL carrier. The measurement information may include RSRP, or may also include RSRQ.

In an embodiment, under a case where it is determined that the non-SUL carrier has a problem, the measurement information of the neighbor cell with highest signal strength among neighbor cells of the secondary cell may be transmitted to the base station through the SUL carrier, so that the base station can determine whether to instruct the user equipment to switch to the neighboring cell with the highest signal strength among neighboring cells of the secondary cell according to the measurement information.

Optionally, the message indicating presence of problems in the random access includes information of the non-SUL carrier.

In an embodiment, under a case where it is determined that the non-SUL carrier has a problem, information of the non-SUL carrier may be included into the message indicating presence of problems in the random access and transmitted to the base station, so that the base station can quickly determine that the non-SUL carrier of the primary cell in the user equipment has a problem, and thereby execute an appropriate processing.

Figure 11:
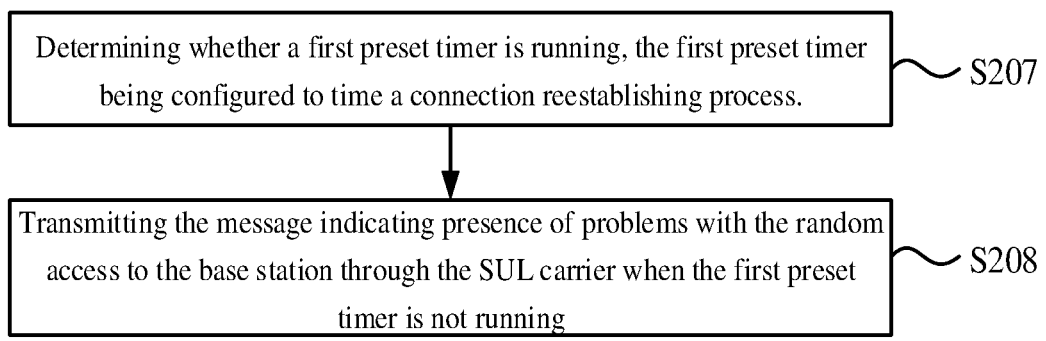
FIG. 11 is a flow chart of still another transmission of a message indicating presence of problems in random access to a base station through an SUL carrier according to an embodiment of the present disclosure.

FIG. 11 is a flow chart of still another transmission of a message indicating presence of problems in random access to a base station through an SUL carrier according to an embodiment of the present disclosure. As shown in FIG. 11, transmitting the message indicating presence of problems in the random access to the base station through the SUL carrier based on the embodiment shown in FIG. 1 may include following steps.

In step S207, it is determined whether a first preset timer is running, the first preset timer being configured to time a connection reestablishing process.

In step S208, the message indicating presence of problems in the random access is transmitted to the base station through the SUL carrier if the first preset timer is not running.

In an embodiment, if the first preset timer is running, it may be determined that the user equipment is in the process of reestablishing connection with the base station. Thus, the user equipment can reestablish the connection with the base station after completion of the connection reestablishing process, which can solve the problems existing in the non-SUL carrier to a certain extent, and thereby requires no necessity to transmit the message indicating presence of problems in the random access to the base station. If the first preset timer is not running, the message indicating presence of problems in the random access is transmitted to the base station through the SUL carrier, which makes it convenient for the base station to deal with the problems quickly.

Figure 12:
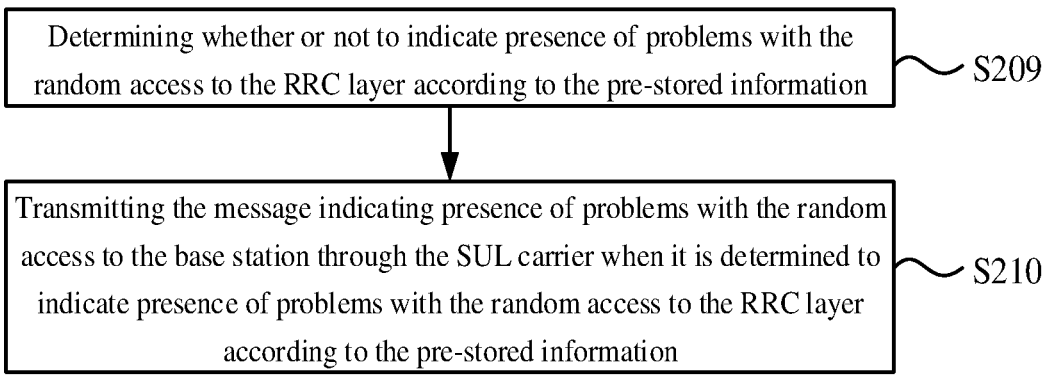
FIG. 12 is a flow chart of still another transmission of a message indicating presence of problems in random access to a base station through an SUL carrier according to an embodiment of the present disclosure.

FIG. 12 is a flow chart of still another transmission of a message indicating presence of problems in random access to a base station through an SUL carrier according to an embodiment of the present disclosure. As shown in FIG. 12, transmitting the message indicating presence of problems in the random access to the base station through the SUL carrier based on the embodiment shown in FIG. 1 may include following steps.

In step S209, it is determined whether to indicate presence of problems in the random access to the RRC layer according to the pre-stored information.

In step S210, the message indicating presence of problems in the random access is transmitted to the base station through the SUL carrier if it is determined to indicate presence of problems in the random access to the RRC layer according to the pre-stored information.

In an embodiment, the indication may be sent to the RRC layer through the MAC layer of the user equipment, where the pre-stored information may be configured at the base station side and sent to the user equipment by the base station, or configured at the user equipment side.

In an embodiment, if the preamble is sent through the non-SUL carrier a number of times greater than the preset number, it may be determined that the non-SUL carrier has a problem. Since the SUL carrier generally has better performance than the non-SUL carrier, the SUL carrier may not have a problem even if the non-SUL carrier has a problem. That is, under a case where the SUL carrier does not have a problem, the user equipment can still communicate with the base station through the SUL carrier of the primary cell.

Hence, it can be determined whether to indicate the presence of problems in random access to the RRC layer according to the pre-stored information. If the presence of problems in random access is not indicated to the RRC layer, it is unnecessary to transmit the message indicating presence of problems in the random access to the base station through the SUL carrier, and if the presence of problems in random access is indicated to the RRC layer, it is necessary to transmit the message indicating presence of problems in the random access to the base station through the SUL carrier.

Figure 13:
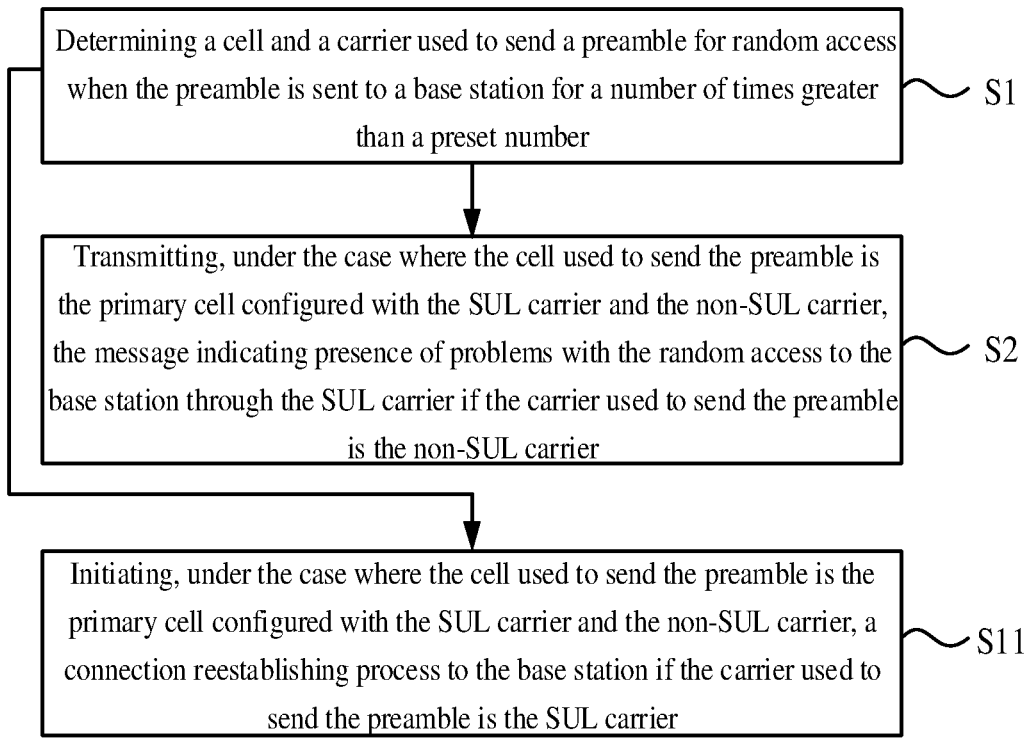
FIG. 13 is a flow chart of still another random access failure processing method according to an embodiment of the present disclosure.

FIG. 13 is a flow chart of still another random access failure processing method according to an embodiment of the present disclosure. As shown in FIG. 13, the method may further include following steps based on the embodiment shown in FIG. 1.

In step S11, under the case where the cell used to send the preamble is the primary cell configured with the SUL carrier and the non-SUL carrier, a connection reestablishing process is initiated to the base station if the carrier used to send the preamble is the SUL carrier.

In an embodiment, if the carrier used to send the preamble is the SUL carrier, the non-SUL carrier must have a problem if the SUL carrier has a problem since the SUL carrier generally has better performance than the non-SUL carrier. That is, under a case where the SUL carrier has a problem, the user equipment may fail to communicate with the base station through the carrier of the primary cell. Thus, the connection reestablishing process may be initiated to the base station to establish a communication connection with the base station, thereby communicating with the base station.

Figure 14:
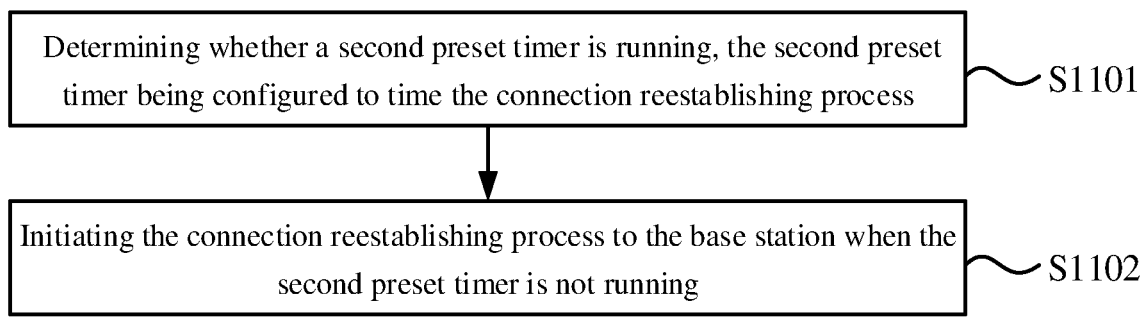
FIG. 14 is a flow chart of initiation of a connection reestablishing process to a base station according to an embodiment of the present disclosure.

FIG. 14 is a flow chart of initiation of a connection reestablishing process to a base station according to an embodiment of the present disclosure. As shown in FIG. 14, initiating the connection reestablishing process to the base station may further include following steps based on the embodiment shown in FIG. 13.

In step S1101, it is determined whether a second preset timer is running, the second preset timer being configured to time the connection reestablishing process.

In step S1102, the connection reestablishing process is initiated to the base station if the second preset timer is not running.

In an embodiment, if the second preset timer is running, it may be determined that the user equipment is in the process of reestablishing connection with the base station. Thus, the user equipment can reestablish the connection with the base station after completion of the connection reestablishing process, which can solve the problems existing in the SUL carrier to a certain extent, and thereby requires no necessity to initiate the connection reestablishing process to the base station. If the second preset timer is not running, the connection reestablishing process is initiated to the base station, so as to reestablish the communication connection with the base station.

Figure 15:
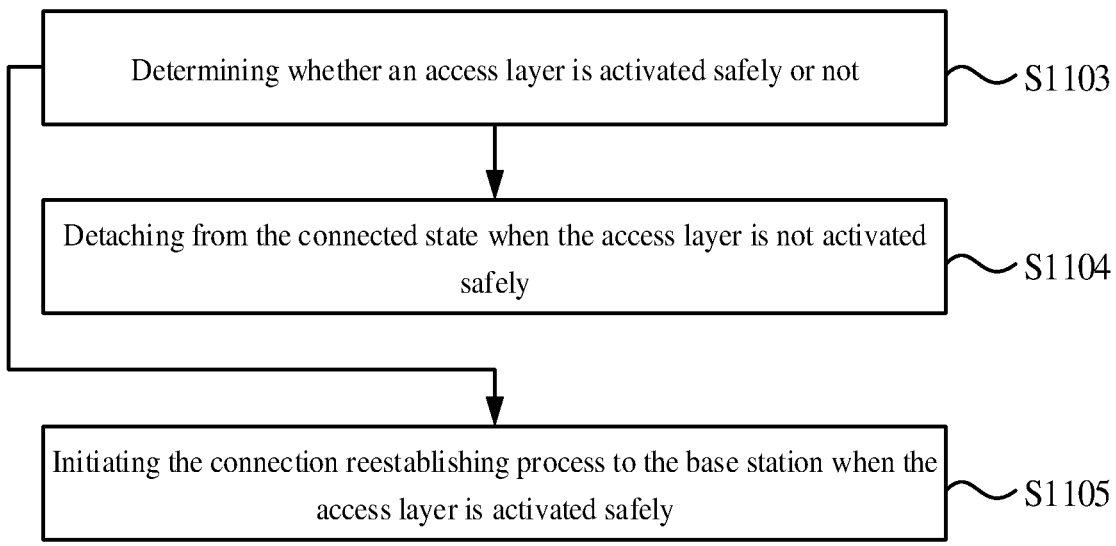
FIG. 15 is a flow chart of another initiation of a connection reestablishing process to a base station according to an embodiment of the present disclosure.

FIG. 15 is a flow chart of another initiation of a connection reestablishing process to a base station according to an embodiment of the present disclosure. As shown in FIG. 15, initiating the connection reestablishing process to the base station may further include following steps based on the embodiment shown in FIG. 13.

In step S1103, it is determined whether an access layer is activated safely or not.

In step S1104, the connection state is detached if the access layer is not activated safely.

In step S1105, the connection reestablishing process is initiated to the base station if the access layer is activated safely.

In an embodiment, if the access layer is not activated safely, it is not safe for the user equipment to establish the communication connection with the base station, and thus the user equipment can be controlled to detach the connection state. If the access layer is activated safely, it is safe for the user equipment to establish the communication connection with the base station, and thus the connection reestablishing process can be initiated to the base station.

Figure 16:
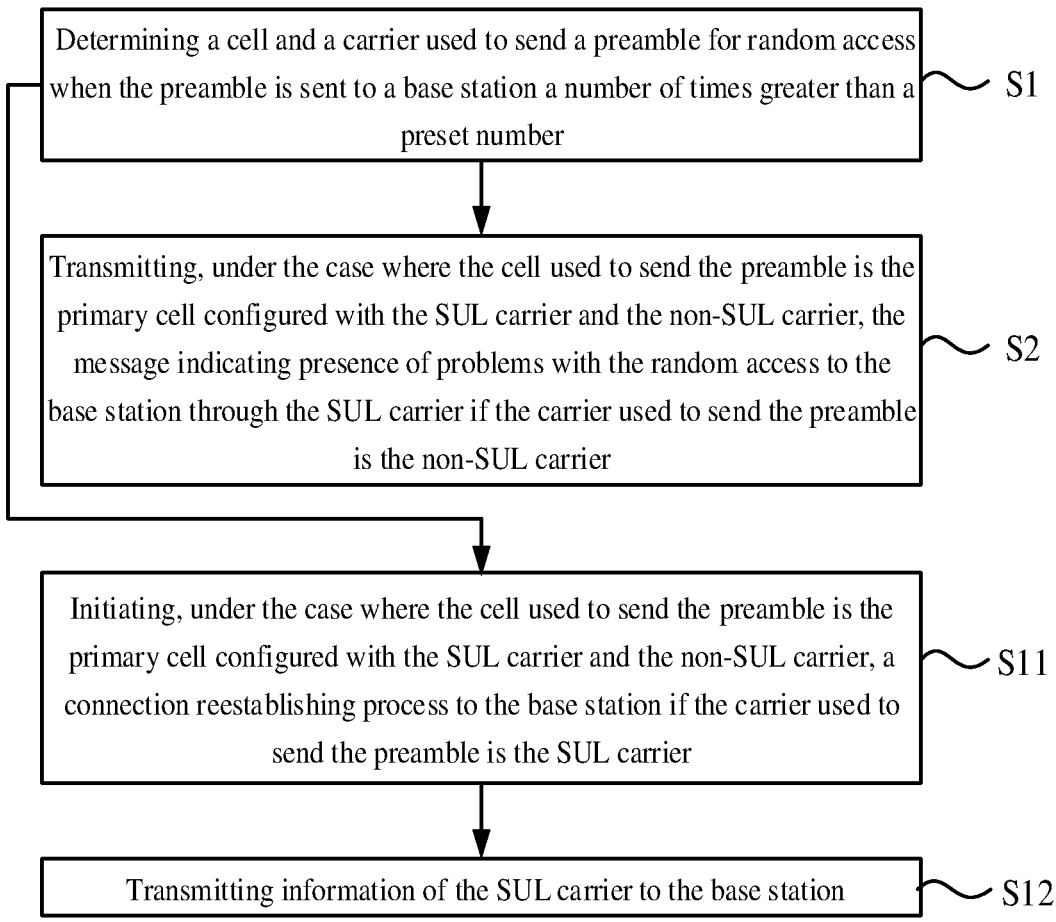
FIG. 16 is a flow chart of still another random access failure processing method according to an embodiment of the present disclosure.

FIG. 16 is a flow chart of still another random access failure processing method according to an embodiment of the present disclosure. As shown in FIG. 16, the method may further include following steps based on the embodiment shown in FIG. 13.

In step S12, information of the SUL carrier is transmitted to the base station.

In an embodiment, under a case where it is determined that the SUL carrier has a problem, information of the SUL carrier may be transmitted to the base station, so that the base station can quickly determine that the SUL carrier of the primary cell in the user equipment has a problem, and thereby execute an appropriate processing.

Figure 17:
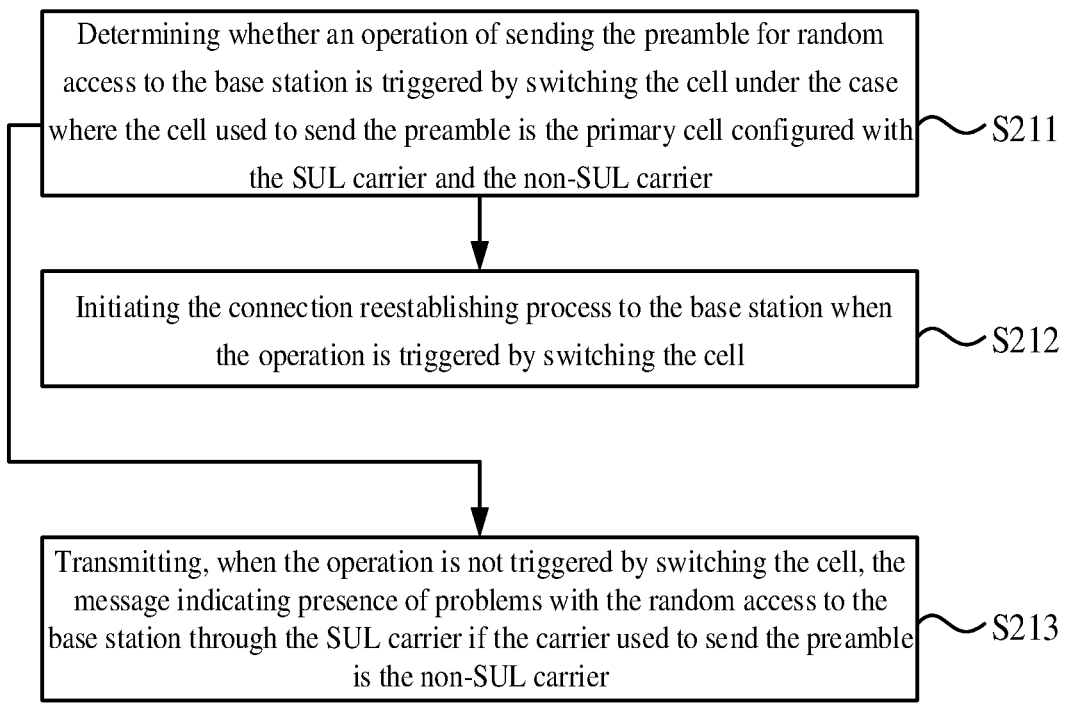
FIG. 17 is a flow chart of still another transmission of a message indicating presence of problems in random access to a base station through an SUL carrier according to an embodiment of the present disclosure.

FIG. 17 is a flow chart of still another transmission of a message indicating presence of problems in the random access to a base station through an SUL carrier according to an embodiment of the present disclosure. As shown in FIG. 17, transmitting the message indicating presence of problems in the random access to the base station through the SUL carrier based on the embodiment shown in FIG. 1 may include following steps.

In step S211, it is determined whether an operation of sending the preamble for random access to the base station is triggered by switching the cell under the case where the cell used to send the preamble is the primary cell configured with the SUL carrier and the non-SUL carrier.

In step S212, if the operation is triggered by switching the cell, the connection reestablishing process is initiated to the base station.

In step S213, if the operation is not triggered by switching the cell, the message indicating presence of problems in the random access is transmitted to the base station through the SUL carrier if the carrier used to send the preamble is the non-SUL carrier.

In an embodiment, if the operation of sending the preamble for random access to the base station is triggered by switching the cell, it may be determined that the cell to which the user is switched has a problem under the case where the preamble for random access is sent a number of times greater than the preset number. Whether the preamble is sent by the SUL carrier or the non-SUL carrier, the connection reestablishing process needs to be initiated to the base station.

If the operation of sending the preamble for random access to the base station is not triggered by switching the cell, the message indicating presence of problems in the random access may be transmitted to the base station through the SUL carrier under the case where the preamble is transmitted through the non-SUL carrier.

Figure 18:
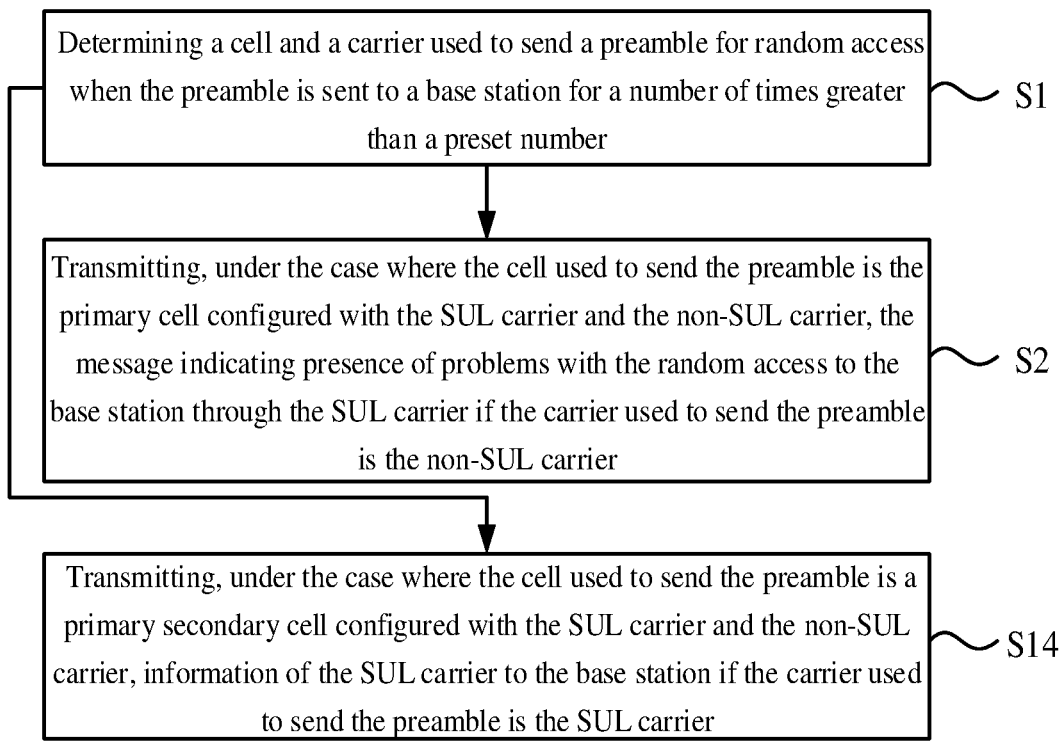
FIG. 18 is a flow chart of still another random access failure processing method according to an embodiment of the present disclosure.

FIG. 18 is a flow chart of still another random access failure processing method according to an embodiment of the present disclosure. As shown in FIG. 18, the method may further include following steps based on the embodiment shown in FIG. 1.

In step S14, under the case where the cell used to send the preamble is a primary secondary cell configured with the SUL carrier and the non-SUL carrier, information of the SUL carrier is transmitted to the base station if the carrier used to send the preamble is the SUL carrier.

In an embodiment, under the case where the preamble is transmitted to the base station through the SUL carrier of a primary secondary cell, it can be determined that the SUL carrier of the primary secondary cell has a problem, and information of the SUL carrier can be transmitted to the base station, so that the base station can quickly determine that the SUL carrier of the primary secondary cell in the user equipment has a problem, and thereby execute an appropriate processing.

Figure 19:
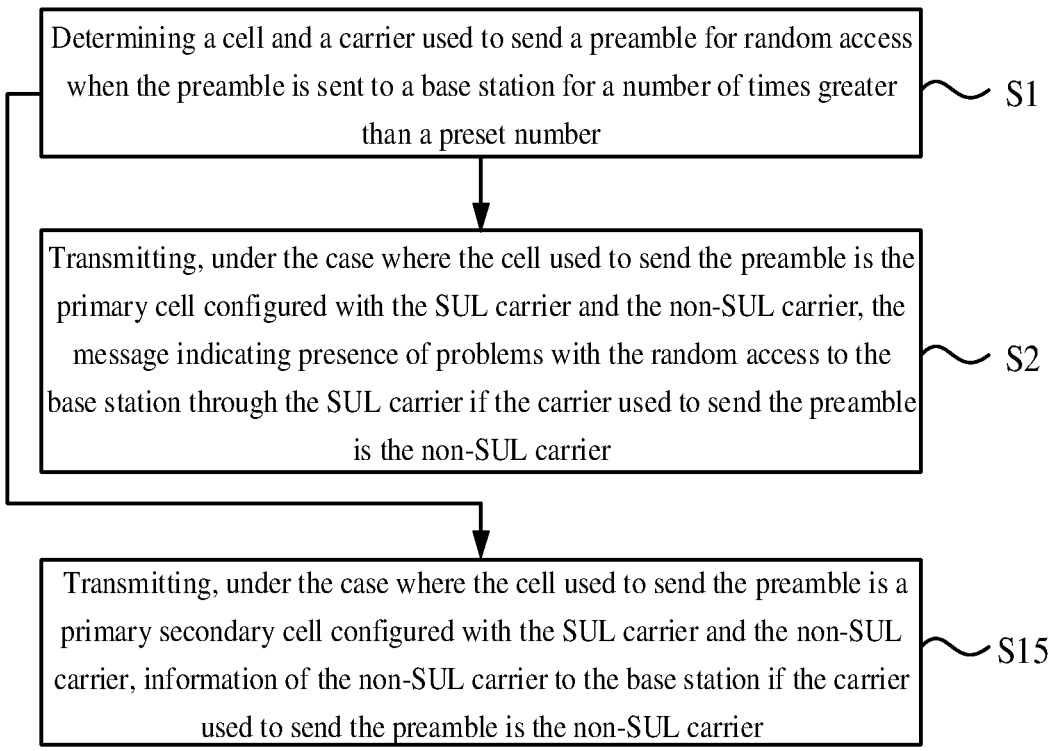
FIG. 19 is a flow chart of still another random access failure processing method according to an embodiment of the present disclosure.

FIG. 19 is a flow chart of still another random access failure processing method according to an embodiment of the present disclosure. As shown in FIG. 19, the method may further include following steps based on the embodiment shown in FIG. 1.

In steps S15, under the case where the cell used to send the preamble is a primary secondary cell configured with the SUL carrier and the non-SUL carrier, information of the non-SUL carrier is transmitted to the base station if the carrier used to send the preamble is the non-SUL carrier.

In an embodiment, under the case where the preamble is transmitted to the base station through the non-SUL carrier of a primary secondary cell, it can be determined that the non-SUL carrier of the primary secondary cell has a problem, and information of the non-SUL carrier can be transmitted to the base station, so that the base station can quickly determine that the non-SUL carrier of the primary secondary cell in the user equipment has a problem, and thereby execute an appropriate processing.

Corresponding to the aforesaid embodiments of the random access failure processing method, the present disclosure also provides embodiments of a random access failure processing apparatus.

Figure 20:
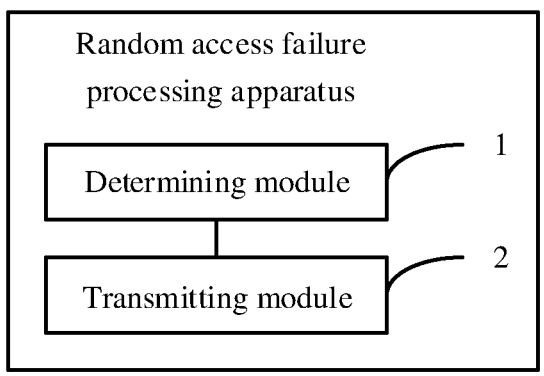
FIG. 20 is a block diagram of a random access failure processing apparatus according to an embodiment of the present disclosure.

FIG. 20 is a block diagram of a random access failure processing apparatus according to an embodiment of the present disclosure. The random access failure processing apparatus according to this embodiment may be applicable to user equipment, e.g. an electronic device such as a mobile phone, a tablet computer, and a wearable device or the like.

As shown in FIG. 20, the random access failure processing apparatus may include following modules.

A determining module 1 is configured to determine a cell and a carrier used to send a preamble for random access when the preamble is sent to a base station a number of times greater than a preset number.

A transmitting module 2 is configured to transmit, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

Figure 21:
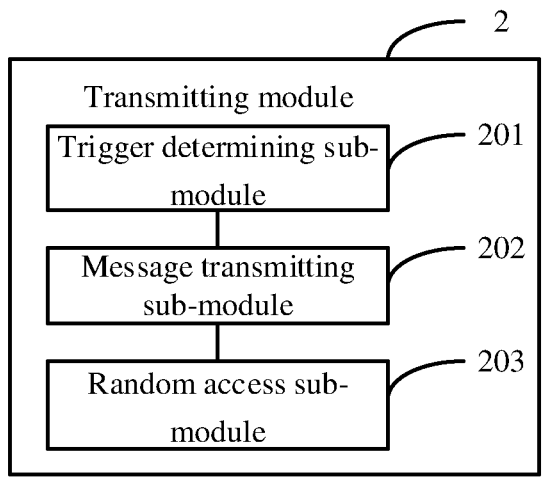
FIG. 21 is a block diagram of a transmitting module according to an embodiment of the present disclosure.

FIG. 21 is a block diagram of a transmitting module according to an embodiment of the present disclosure. As shown in FIG. 21, the transmitting module 2 may further include following sub-modules based on the embodiment shown in FIG. 20.

A trigger determining sub-module 201 is configured to determine whether the random access is triggered by transmitting the message indicating presence of problems in the random access to the base station through the SUL carrier.

A message transmitting sub-module 202 is configured to transmit the message indicating presence of problems in the random access to the base station through the SUL carrier if the random access is not triggered.

A random access sub-module 203 is configured to initiate the random access to the base station through the SUL carrier if the random access is triggered.

The message transmitting sub-module 202 is further configured to transmit the message indicating presence of problems in the random access to the base station through the SUL carrier after the random access sub-module 203 successfully initiates the random access to the base station through the SUL carrier.

Figure 22:
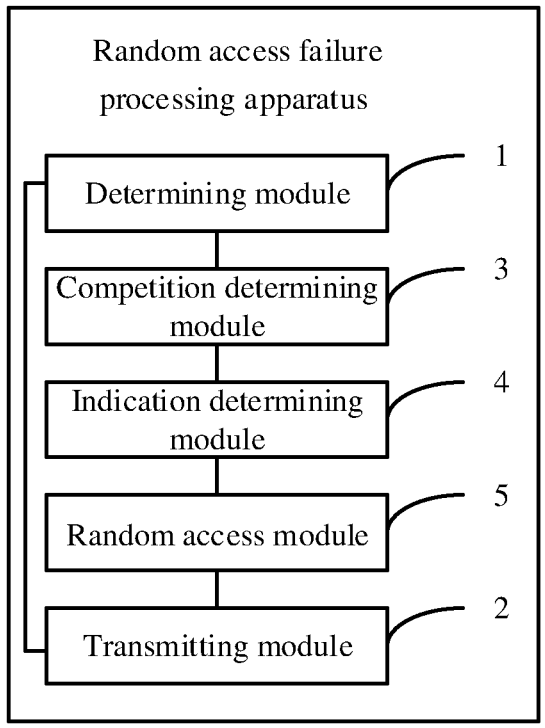
FIG. 22 is a block diagram of another random access failure processing apparatus according to an embodiment of the present disclosure.

FIG. 22 is a block diagram of another random access failure processing apparatus according to an embodiment of the present disclosure. As shown in FIG. 22, the apparatus may further include following modules based on the embodiment shown in FIG. 20.

A competition determining module 3 is configured to determine whether a competition-based random access is triggered on the primary cell prior to transmitting the message indicating presence of problems in the random access to the base station through the SUL carrier.

An indication determining module 4 is configured to determine whether a message indicating a carrier used to initiate the random access exists or not if the competition-based random access is triggered.

A random access module 5 is configured to initiate the competition-based random access to the base station through the SUL carrier if the message indicating the carrier used to initiate the random access does not exist.

Figure 23:
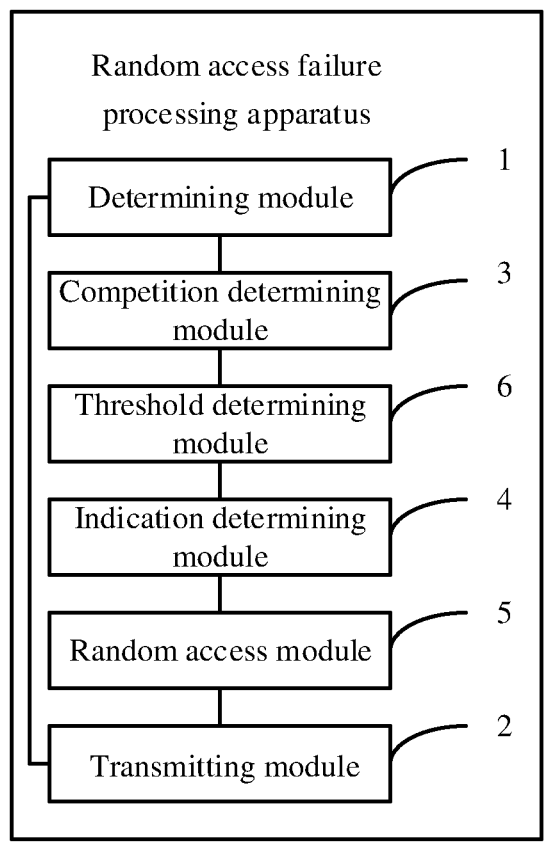
FIG. 23 is a block diagram of still another random access failure processing apparatus according to an embodiment of the present disclosure.

FIG. 23 is a block diagram of still another random access failure processing apparatus according to an embodiment of the present disclosure. As shown in FIG. 23, the apparatus may further include following modules based on the embodiment shown in FIG. 20.

A threshold determining module 6 is configured to determine whether a cell signal threshold which is associated with selection of the carrier while initiating the random access is received if the competition-based random access is triggered.

The indication determining module is further configured to determine whether the message indicating the carrier used to initiate the random access exists or not if the cell signal threshold is received.

The random access module is further configured to determine to initiate the competition-based random access to the base station through the SUL carrier or the non-SUL carrier according to the cell signal threshold if the message indicating the carrier used to initiate the random access does not exist.

Optionally, the message indicating presence of problems in the random access is a master cell group radio link failure message.

Optionally, the transmitting module is further configured to transmit a preset field to the base station through the SUL carrier, the preset field being associated with the master cell group radio link failure message.

Optionally, the transmitting module is further configured to carry the master cell group radio link failure message in any message transmitted to the base station through the SUL carrier.

Optionally, the transmitting module is further configured to transmit measurement information of each serving cell in the master cell group of the user equipment to the base station through the SUL carrier.

Optionally, the transmitting module is further configured to transmit measurement information of a neighbor cell with highest signal strength among neighbor cells of the primary cell to the base station through the SUL carrier.

Optionally, the transmitting module is further configured to transmit measurement information of each serving cell in the secondary cell group of the user equipment to the base station through the SUL carrier.

Optionally, the transmitting module is further configured to transmit measurement information of a neighbor cell with highest signal strength among neighbor cells of the secondary cell to the base station through the SUL carrier.

Optionally, the message indicating presence of problems in the random access includes information of the non-SUL carrier.

Figure 24:
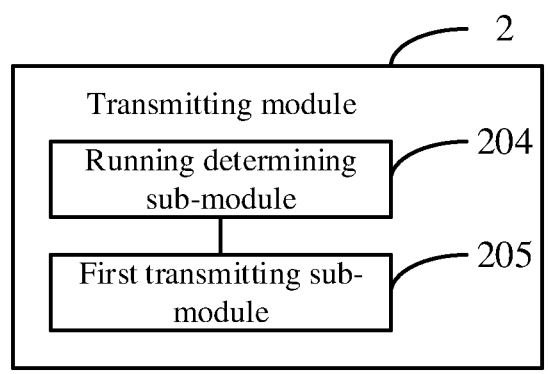
FIG. 24 is a block diagram of another transmitting module according to an embodiment of the present disclosure.

FIG. 24 is a block diagram of another transmitting module according to an embodiment of the present disclosure. As shown in FIG. 24, the transmitting module may further include following sub-modules based on the embodiment shown in FIG. 20.

A running determining sub-module 204 is configured to determine whether a first preset timer is running, the first preset timer being configured to time a connection reestablishing process.

A first transmitting sub-module 205 is configured to transmit the message indicating presence of problems in the random access to the base station through the SUL carrier if the first preset timer is not running.

Figure 25:
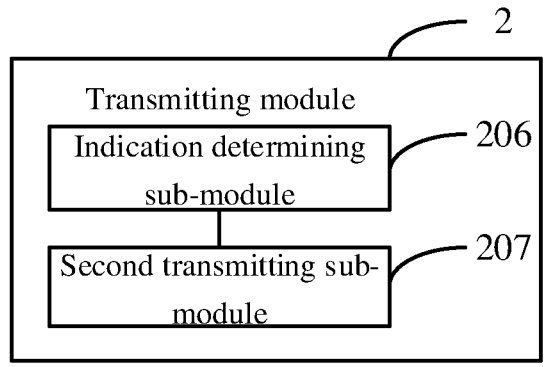
FIG. 25 is a block diagram of still another transmitting module according to an embodiment of the present disclosure.

FIG. 25 is a block diagram of still another transmitting module according to an embodiment of the present disclosure. As shown in FIG. 25, the transmitting module may further include following sub-modules based on the embodiment shown in FIG. 20.

An indication determining sub-module 206 is configured to determine, under the case where the cell used to send the preamble is the primary cell configured with the SUL carrier and the non-SUL carrier, whether to indicate or not indicate presence of problems in the random access to a RRC layer according to pre-stored information if the carrier used to send the preamble is the non-SUL carrier.

A second transmitting sub-module 207 is configured to transmit the message indicating presence of problems in the random access to the base station through the SUL carrier if it is determined to indicate presence of problems in the random access to the RRC layer according to the pre-stored information.

Figure 26:
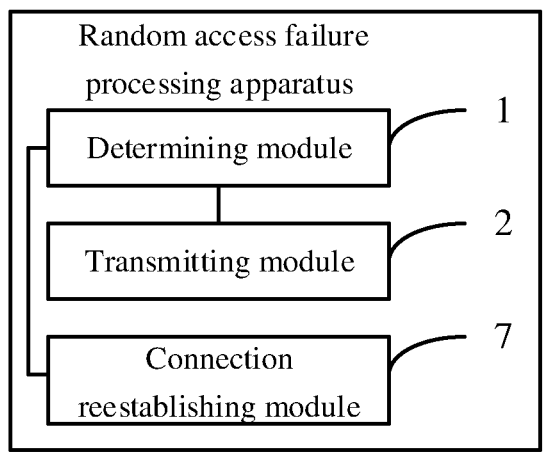
FIG. 26 is a block diagram of still another random access failure processing apparatus according to an embodiment of the present disclosure.

FIG. 26 is a block diagram of still another random access failure processing apparatus according to an embodiment of the present disclosure. As shown in FIG. 26, the apparatus may further include following modules based on the embodiment shown in FIG. 20.

A connection reestablishing module 7 is configured to initiate, under the case where the cell used to send the preamble is the primary cell configured with the SUL carrier and the non-SUL carrier, the connection reestablishing process to the base station if the carrier used to send the preamble is the SUL carrier.

Figure 27:
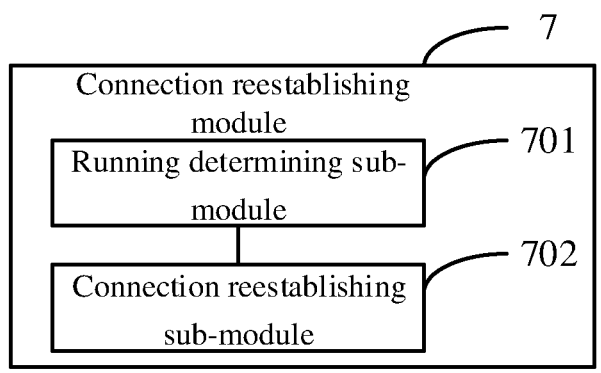
FIG. 27 is a block diagram of a connection reestablishing module according to an embodiment of the present disclosure.

FIG. 27 is a block diagram of a connection reestablishing module according to an embodiment of the present disclosure. As shown in FIG. 27, the connection reestablishing module 7 may further include following sub-modules based on the embodiment shown in FIG. 26.

A running determining sub-module 701 is configured to determine whether a second preset timer is running, the second preset timer being configured to time the connection reestablishing process.

A connection reestablishing sub-module 702 is configured to initiate the connection reestablishing process to the base station if the second preset timer is not running.

Figure 28:
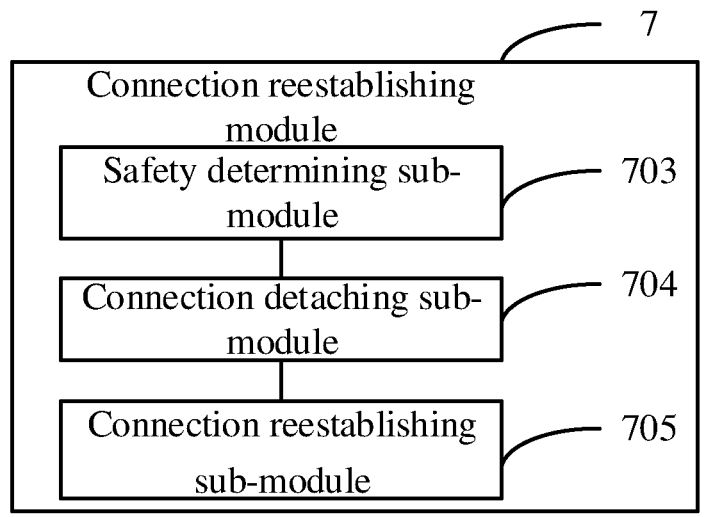
FIG. 28 is a block diagram of another connection reestablishing module according to an embodiment of the present disclosure.

FIG. 28 is a block diagram of another connection reestablishing module according to an embodiment of the present disclosure. As shown in FIG. 28, the connection reestablishing module 7 may further include following sub-modules based on the embodiment shown in FIG. 26.

A safety determining sub-module 703 is configured to determine whether an access layer is activated safely or not.

A connection detaching sub-module 704 is configured to detach the connection state if the access layer is not activated safely.

A connection reestablishing sub-module 705 is configured to initiate the connection reestablishing process to the base station if the access layer is activated safely.

Optionally, the transmitting module is further configured to transmit information of the SUL carrier to the base station.

Figure 29:
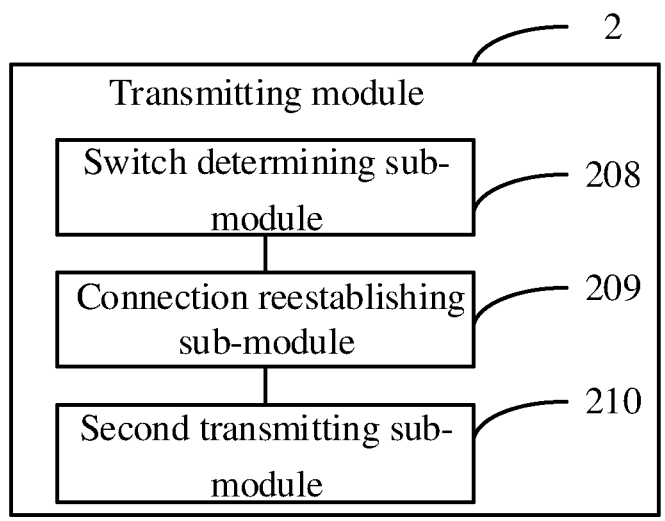
FIG. 29 is a block diagram of still another transmitting module according to an embodiment of the present disclosure.

FIG. 29 is a block diagram of still another transmitting module according to an embodiment of the present disclosure. As shown in FIG. 29, the transmitting module 2 may further include following sub-modules based on the embodiment shown in FIG. 20.

A switch determining sub-module 208 is configured to determine whether an operation of sending the preamble for random access to the base station is triggered by switching the cell under the case where the cell used to send the preamble is the primary cell configured with the SUL carrier and the non-SUL carrier.

A connection reestablishing sub-module 209 is configured to initiate the connection reestablishing process to the base station if the operation is triggered by switching the cell.

A second transmitting sub-module 210 is configured to transmit, if the operation is not triggered by switching the cell, the message indicating presence of problems in the random access to the base station through the SUL carrier if the carrier used to send the preamble is the non-SUL carrier.

Optionally, the transmitting module is further configured to transmit, under the case where the cell used to send the preamble is a primary secondary cell configured with the SUL carrier and the non-SUL carrier, information of the SUL carrier if the carrier used to send the preamble is the SUL carrier.

Optionally, the transmitting module is further configured to transmit, under the case where the cell used to send the preamble is a primary secondary cell configured with the SUL carrier and the non-SUL carrier, information of the non-SUL carrier if the carrier used to send the preamble is the non-SUL carrier.

With regard to the apparatus in the aforesaid embodiments, the specific manner in which the respective modules perform the operations has been described in detail in the embodiments of the method, and will not be explained in detail herein.

Since the apparatus embodiments substantially correspond to the method embodiments, similar parts of the method embodiments may be referred to for the apparatus embodiments. The above apparatus embodiments are illustrative only. The units described as separate members may be or may not be physically separated. The members described as units may be or may not be physical units, may be located at the same place or may be distributed in multiple network units. The objectives of the solutions of this invention may be realized by selecting some or all of the modules according to the actual needs. The above can be understood and implemented by those skilled in the art without any inventive work.

The embodiment of the present disclosure further provides an electronic device applicable to user equipment in a connection state, including:

a processor;

a memory for storing a processor-executable instruction, wherein the processor is configured to:

determine a cell and a carrier used to send a preamble for random access when the preamble is sent to a base station a number of times greater than a preset number; and transmit, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

The embodiment of the present disclosure further provides a computer readable storage medium in which a computer program in stored, wherein the computer readable storage medium is applicable to user equipment in a connection state, and when the program is executed by a processor, following steps are realized:

determining a cell and a carrier used to send a preamble for random access when the preamble for random access is sent to a base station a number of times greater than a preset number; and transmitting, under a case where the cell used to send the preamble is a primary cell configured with an SUL carrier and a non-SUL carrier, a message indicating presence of problems in the random access to the base station through the SUL carrier if the carrier used to send the preamble is the non-SUL carrier.

Figure 30:
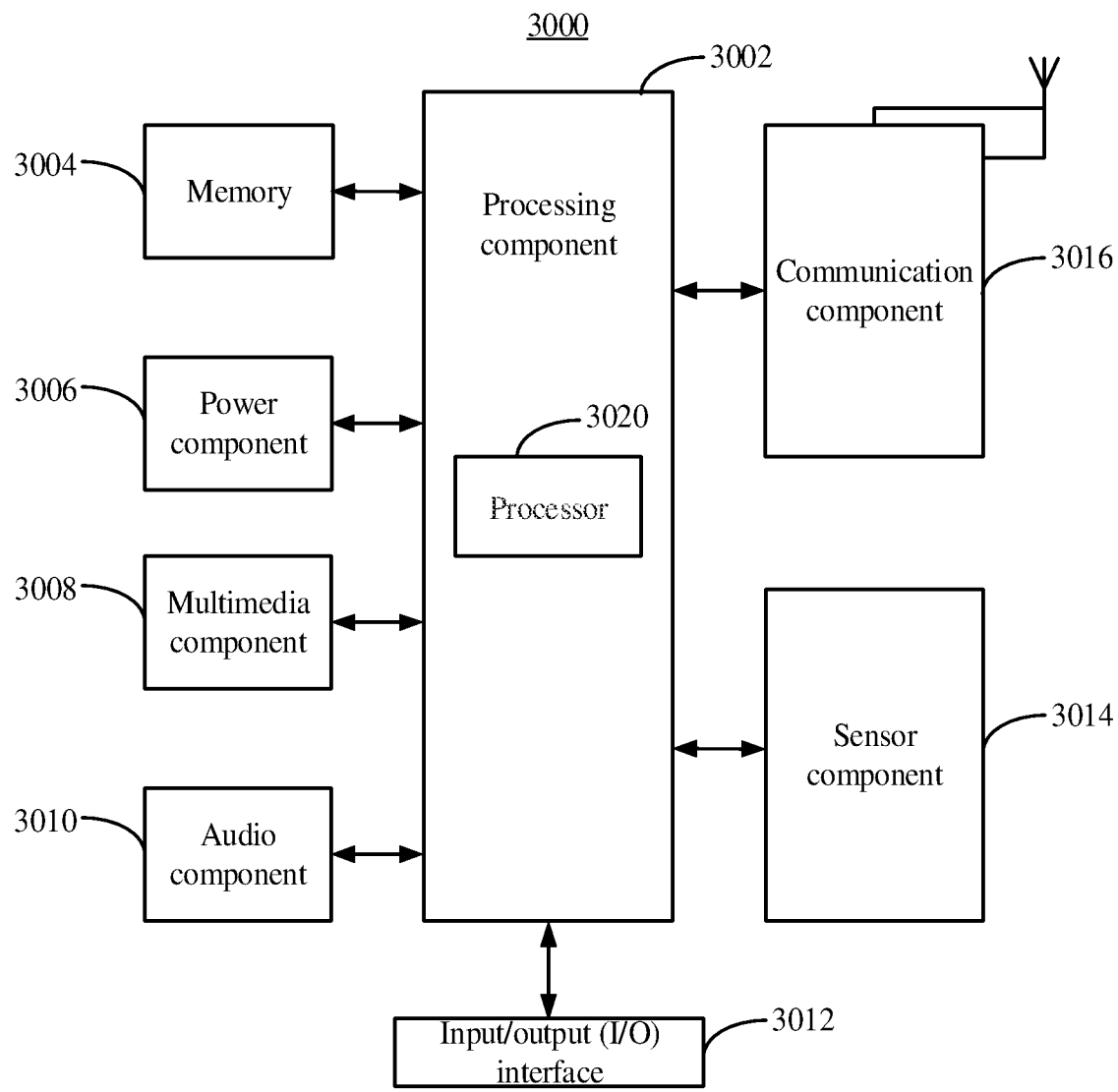
FIG. 30 is a block diagram of a random access failure processing apparatus according to an exemplary embodiment

FIG. 30 is a block diagram of a random access failure processing apparatus 3000 according to an exemplary embodiment. For example, the apparatus 3000 may be a mobile phone, a computer, a digital broadcast terminal, a messaging device, a gaming console, a tablet device, a medical device, a fitness equipment, a personal digital assistant, and the like.

Referring to FIG. 30, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls the overall operations of the apparatus 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, videos, etc. The memory 3004 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 3008 includes a front camera and/or a rear camera. The front camera and the rear camera may receive external multimedia data while the apparatus 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive external audio signals when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker for outputting audio signals.

The I/O interface 3012 provides an interface between the processing component 3002 and peripheral interface modules, such as a keyboard, a click wheel, buttons, and the like. The buttons may include, but are not limited to, a home button, a volume button, a start button, and a lock button.

The sensor component 3014 includes one or more sensors to provide status assessments of various aspects of the apparatus 3000. For instance, the sensor component 3014 may detect an on/off status of the apparatus 3000, relative positioning of components. e.g., the display device and the mini keyboard of the apparatus 3000, and the sensor component 3014 may also detect a position change of the apparatus 3000 or a component of the apparatus 3000, presence or absence of user contact with the apparatus 3000, orientation or acceleration/deceleration of the apparatus 3000, and temperature change of the apparatus 3000. The sensor component 3014 may include a proximity sensor configured to detect the presence of nearby objects without any physical contact. The sensor component 3014 may also include a light sensor, such as a CMOS or CCD image sensor, used for imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the apparatus 3000 and other devices. The apparatus 3000 can access a wireless network based on a communication standard, such as WiFi, 2G, or 3G, or a combination thereof. In an exemplary embodiment, the communication component 3016 receives broadcast signals or broadcast associated information from an external broadcast management system via a broadcast channel. In an exemplary embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 3004 including instructions, executable by the processor 3020 in the apparatus 3000, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

It should be noted that in the context, the relational terms such as first and second are merely used to distinguish one entity or operation from another entity or operation, and do not necessarily require or imply that these entities or operations have any such actual relationship or order. Furthermore, the terms "comprises." "contains," or any other variants are intended to cover the nonexclusive containing, such that the processes, methods, commodities or devices comprising a series of elements not only comprise those elements, but also comprise other unclearly listed elements, or also comprise the inherent elements of such processes, methods, commodities or devices. Without more limitations, the element defined by the phrase "comprising a . . . " does not exclude the existence of other same elements in the process, method, commodity, or device that comprising such element.

The method and apparatus provided by the embodiments of the present disclosure have been described in detail above. Specific examples are used herein to explain the principles and implementations of the present disclosure. The descriptions of the above embodiments are only configured to help understand the method and the core idea of the present disclosure. Meanwhile, for a person of ordinary skill in the art, there will be changes in the specific implementation and the application scope according to the idea of the present disclosure. In summary, the content of the Description should not be understood as a limitation on the present disclosure.

The invention claimed is:

1. A random access failure processing method applicable to user equipment in a connection state, comprising:
   determining a cell and a carrier used to send a preamble for random access when the preamble is sent to a base station a number of times greater than a preset number; and
   transmitting, under a case where the cell used to send the preamble is a primary cell configured with a supplement uplink (SUL) carrier and a non-SUL carrier, a message indicating presence of problems in the random access to the base station through the SUL carrier in response to that the carrier used to send the preamble is the non-SUL carrier,
   wherein transmitting the message indicating presence of problems in the random access to the base station through the SUL carrier comprises:
      determining whether the random access is triggered by transmitting the message indicating presence of problems in the random access to the base station through the SUL carrier;

transmitting the message indicating presence of problems in the random access to the base station through the SUL carrier when the random access is not triggered;
initiating the random access to the base station through the SUL carrier when the random access is triggered; and
transmitting the message indicating presence of problems in the random access to the base station through the SUL carrier after successfully initiating the random access to the base station through the SUL carrier.

2. The method according to claim 1, further comprising:
determining whether a competition-based random access is triggered on the primary cell prior to transmitting the message indicating presence of problems in the random access to the base station through the SUL carrier;
determining whether a message indicating a carrier used to initiate the random access exists or not when the competition-based random access is triggered; and
initiating the competition-based random access to the base station through the SUL carrier when the message indicating the carrier used to initiate the random access does not exist.

3. The method according to claim 2, further comprising:
determining whether a cell signal threshold associated with selection of the carrier while initiating the random access is received when the competition-based random access is triggered; wherein
determining whether the message indicating the carrier used to initiate the random access exists or not when the competition-based random access is triggered, and initiating the competition-based random access to the base station through the SUL carrier when the message indicating the carrier used to initiate the random access does not exist comprise:
determining whether the message indicating the carrier used to initiate the random access exists or not when the cell signal threshold is received; and
determining to initiate the competition-based random access to the base station through the SUL carrier or the non-SUL carrier according to the cell signal threshold when the message indicating the carrier used to initiate the random access does not exist.

4. The method according to claim 1, wherein the message indicating presence of problems in the random access is a master cell group radio link failure message.

5. The method according to claim 4, wherein transmitting the message indicating presence of problems in the random access to the base station through the SUL carrier comprises:
transmitting a preset field to the base station through the SUL carrier, the preset field being associated with the master cell group radio link failure message.

6. The method according to claim 4, wherein transmitting the message indicating presence of problems in the random access to the base station through the SUL carrier comprises:
carrying the master cell group radio link failure message in any message transmitted to the base station through the SUL carrier.

7. The method according to claim 1, further comprising:
transmitting measurement information of each serving cell in a master cell group of the user equipment to the base station through the SUL carrier.

8. The method according to claim 7, further comprising:
transmitting measurement information of a neighbor cell with highest signal strength among neighbor cells of the primary cell to the base station through the SUL carrier.

9. The method according to claim 1, further comprising:
transmitting measurement information of each serving cell in a secondary cell group of the user equipment to the base station through the SUL carrier.

10. The method according to claim 9, further comprising:
transmitting measurement information of a neighbor cell with highest signal strength among neighbor cells of a secondary cell to the base station through the SUL carrier.

11. The method according to claim 1, wherein the message indicating presence of problems in the random access comprises information of the non-SUL carrier.

12. The method according to claim 1, wherein transmitting the message indicating presence of problems in the random access to the base station through the SUL carrier comprises:
determining whether a first preset timer is running, the first preset timer being configured to time a connection reestablishing process; and
transmitting the message indicating presence of problems in the random access to the base station through the SUL carrier when the first preset timer is not running.

13. The method according to claim 1, wherein transmitting the message indicating presence of problems in the random access to the base station through the SUL carrier comprises:
determining, under the case where the cell used to send the preamble is the primary cell configured with the SUL carrier and the non-SUL carrier, whether to indicate or not indicate presence of problems in random access to a radio resource control (RRC) layer according to pre-stored information in response to that the carrier used to send the preamble is the non-SUL carrier; and
transmitting the message indicating presence of problems in the random access to the base station through the SUL carrier when it is determined to indicate presence of problems in the random access to the RRC layer according to the pre-stored information.

14. The method according to claim 1, further comprising:
initiating, under the case where the cell used to send the preamble is the primary cell configured with the SUL carrier and the non-SUL carrier, a connection reestablishing process to the base station in response to that the carrier used to send the preamble is the SUL carrier.

15. The method according to claim 14, wherein initiating the connection reestablishing process to the base station comprises:
determining whether a second preset timer is running, the second preset timer being configured to time the connection reestablishing process; and
initiating the connection reestablishing process to the base station when the second preset timer is not running.

16. The method according to claim 14, wherein initiating the connection reestablishing process to the base station comprises:
determining whether an access layer is activated safely or not;
detaching the connection state when the access layer is not activated safely; and
initiating the connection reestablishing process to the base station when the access layer is activated safely.

17. The method according to claim 14, further comprising:
- transmitting information of the SUL carrier to the base station.

18. The method according to claim 17, wherein transmitting the message indicating presence of problems in the random access to the base station through the SUL carrier comprises:
- determining whether an operation of sending the preamble for random access to the base station is triggered by switching the cell under the case where the cell used to send the preamble is the primary cell configured with the SUL carrier and the non-SUL carrier;
- initiating the connection reestablishing process to the base station when the operation is triggered by switching the cell; and
- transmitting, when the operation is not triggered by switching the cell, the message indicating presence of problems in the random access to the base station through the SUL carrier in response to that the carrier used to send the preamble is the non-SUL carrier.

19. The method according to claim 17, further comprising:
- transmitting, under the case where the cell used to send the preamble is a primary secondary cell configured with the SUL carrier and the non-SUL carrier, information of the SUL carrier to the base station in response to that the carrier used to send the preamble is the SUL carrier.

20. The method according to claim 17, further comprising:
- transmitting, under the case where the cell used to send the preamble is a primary secondary cell configured with the SUL carrier and the non-SUL carrier, information of the non-SUL carrier to the base station in response to that the carrier used to send the preamble is the non-SUL carrier.

21. User equipment in a connection state, comprising:
a processor; and
a memory for storing a processor-executable instruction, wherein
the processor is configured to:
- determine a cell and a carrier used to send a preamble for random access when the preamble is sent to a base station a number of times greater than a preset number; and
- transmit, under a case where the cell used to send the preamble is a primary cell configured with a supplement uplink (SUL) carrier and a non-SUL carrier, a message indicating presence of problems in the random access to the base station through the SUL carrier in response to that the carrier used to send the preamble is the non-SUL carrier, wherein in transmitting the message indicating presence of problems in the random access to the base station through the SUL carrier, the processor is configured to:
- determine whether the random access is triggered by transmitting the message indicating presence of problems in the random access to the base station through the SUL carrier;
- transmit the message indicating presence of problems in the random access to the base station through the SUL carrier when the random access is not triggered;
- initiate the random access to the base station through the SUL carrier when the random access is triggered; and
- transmit the message indicating presence of problems in the random access to the base station through the SUL carrier after successfully initiating the random access to the base station through the SUL carrier.

* * * * *